United States Patent [19]

Kang et al.

[11] Patent Number: 5,725,184
[45] Date of Patent: Mar. 10, 1998

[54] BRAKE RUDDER PEDAL SYSTEM FOR LIGHT AIRCRAFT

[75] Inventors: Q-Seop Kang; Chan-Won Jun; Ki-Du Lee, all of Daejon, Rep. of Korea

[73] Assignee: Agency For Defense Development, Daejon, Rep. of Korea

[21] Appl. No.: 656,092

[22] Filed: May 31, 1996

[30] Foreign Application Priority Data

Jun. 1, 1995 [KR] Rep. of Korea ............... 14499/1995

[51] Int. Cl.⁶ .................................................. B64C 13/06
[52] U.S. Cl. ........................ 244/235; 74/478; 74/512
[58] Field of Search .................... 244/235; 74/478, 74/478.5, 512, 480 R, 52 L

[56] References Cited

U.S. PATENT DOCUMENTS

| | | | |
|---|---|---|---|
| 2,478,546 | 8/1949 | Pickens et al. | 244/235 |
| 2,516,397 | 7/1950 | Kress et al. | 244/235 |
| 2,585,688 | 2/1952 | Sauliner | 244/235 |
| 2,610,006 | 9/1952 | Boyce | 244/235 |
| 4,192,476 | 3/1980 | Byers . | |
| 4,484,722 | 11/1984 | Larson et al. . | |
| 4,848,708 | 7/1989 | Farrell et al. . | |
| 5,056,742 | 10/1991 | Sakurai . | |

*Primary Examiner*—Galen L. Barefoot
*Attorney, Agent, or Firm*—Scully, Scott, Murphy & Presser

[57] ABSTRACT

A brake rudder pedal system for a light aircraft is disclosed including a pair of pedal bodies whose tops are rotatably supported between hull frames; rudder and steering operation members being rotatably connected to the pedal bodies thereoutside, the member having upper first arms connected to a rudder operating flexible cable and to moving-left-and-right flexible cable, and lower second arms connected to the steering mechanism by a steering rod; brake operating member having a brake pedal whose lower portion is rotatably supported to the pedal bodies, and a brake lever connected to a brake pedal and for operating a brake mechanism; and pedal position controller member having a control handle rotatably disposed on a gauge board cover, a pair of transmission flexible cables rotated while connected to the control handle, a control nut supported to said pedal bodies to be movable forward and rearward, a support block supported to the connection arm to be movable forward and rearward, and a control screw rod supported to the support block while idling at its original position, the control screw rod being screw-fastened to the nut and whose top is fixedly connected to the transmission flexible cable.

8 Claims, 15 Drawing Sheets

BRAKE RUDDER PEDAL SYSTEM FOR LIGHT AIRCRAFT

BACKGROUND OF THE INVENTION

1. Field of the Invention

The present invention relates to a brake rudder pedal system for a light aircraft, and more particularly, to an improved brake rudder pedal system for a light aircraft by which the position of a brake and rudder pedal can be adjusted very fast, easily and accurately during flight as well as on the earth.

2. Description of the Conventional Art

Generally speaking, a light aircraft has a rudder movable leftwardly and rightwardly and provided at the back of its vertical stabilizer fin as means of converting the direction of the flight leftwardly or rightwardly during flight, and a rudder pedal for rotating the rudder leftwardly and rightwardly. In addition, there are provided a landing gear steering mechanism for steering the nose landing gear leftwardly and rightwardly, and a brake system for braking the running of the aircraft on the earth. Here, the rudder pedal, the landing gear steering mechanism and the brake pedal are operated by a pilot when pressing or releasing them using feet of the pilot. In addition, such systems are controllable forwardly and rearwardly according to the pilot's physical condition.

Such a brake rudder pedal adjustment system was disclosed in U.S. Pat. No. 4,192,476 by Leroy R. Byer et al. In this disclosure, the locking of the rudder pedal is released by a plurality of sheaves, a rope wound around the sheaves, and a linkage connected to the rope. Then, the rudder pedal is adjusted to a desired position and locked again. The structure of the system is very complicated. In addition, the position of the rudder pedal can be controlled only on the earth prior to takeoff but not during flight. This disables the position of the rudder pedal from being corrected after takeoff, precluding a comfortable flying.

Another system was disclosed in U.S. Pat. No. 5,055,742 by Seiya Sakurai et al. In this system, two jackshaft assemblies are used. However, these assemblies are too heavy to be appropriate for a light aircraft.

U.S. Pat. No. 4,848,708 by Gerald T. Farrell et al. teaches still another system in which the position of the rudder pedal is controlled by rotating the pedal body that rotatably supports the rudder pedal. This system has a disadvantage in that it requires a separate centering unit and that the pedal body itself is thick and heavy.

Yet another system was disclosed in U.S. Pat. No. 4,484,722 by George W. Larson, in which the relative position of the rudder pedal is adjusted by controlling the pilot's seat. However, this must ensure as large a space as the adjustment of the seat. In order to adjust the seat, the pilot must manipulate the knob disposed under the seat so that the control cannot be performed during flight.

SUMMARY OF THE INVENTION

Accordingly, it is an object of the present invention to provide a brake rudder pedal system for a light aircraft whose structure is simplified, in which the position of the brake and rudder pedals is controlled very fast and easily, and the weight of the same is light to be appropriate for a light aircraft.

It is another object of the present invention to provide a brake rudder pedal system for enabling the position of the brake and rudder pedals to be controlled during flight as well as on the earth.

To accomplish the above objects of the present invention, there is provided a brake rudder pedal system for a light aircraft having a pedal assembly comprising rudder and steering operation members for manipulating a rudder and steering mechanism, and brake operation members for operating a brake mechanism, the pedal assembly comprising: a pair of pedal bodies whose tops are rotatably supported between hull frames; the rudder and steering operation members being rotatably connected to the pedal bodies thereoutside, the member having upper first arms connected to a rudder operating flexible cable and to moving-left-and-right flexible cable, and lower second arms connected to the steering mechanism by a steering rod; the brake operating member having a brake pedal whose lower portion is rotatably supported to the pedal bodies, and a brake lever connected to the brake pedal and for operating the brake mechanism; and pedal position controller member having a control handle rotatably disposed on a gauge board cover, a pair of transmission flexible cables rotated while connected to the control handle, a control nut supported to the pedal bodies to be movable forward and rearward, a support block supported to the connection arm to be movable forward and rearward, and a control screw rod supported to the support block while idling at its original position, the control screw rod being screw-fastened to the nut and whose top is fixedly connected to the transmission flexible cable.

BRIEF DESCRIPTION OF THE ATTACHED DRAWINGS

The present invention will become more fully understood from the detailed description given hereinbelow and the accompanying drawings which are given by way of illustration only, and thus are not limitative of the present invention, and wherein.

Figure 7:
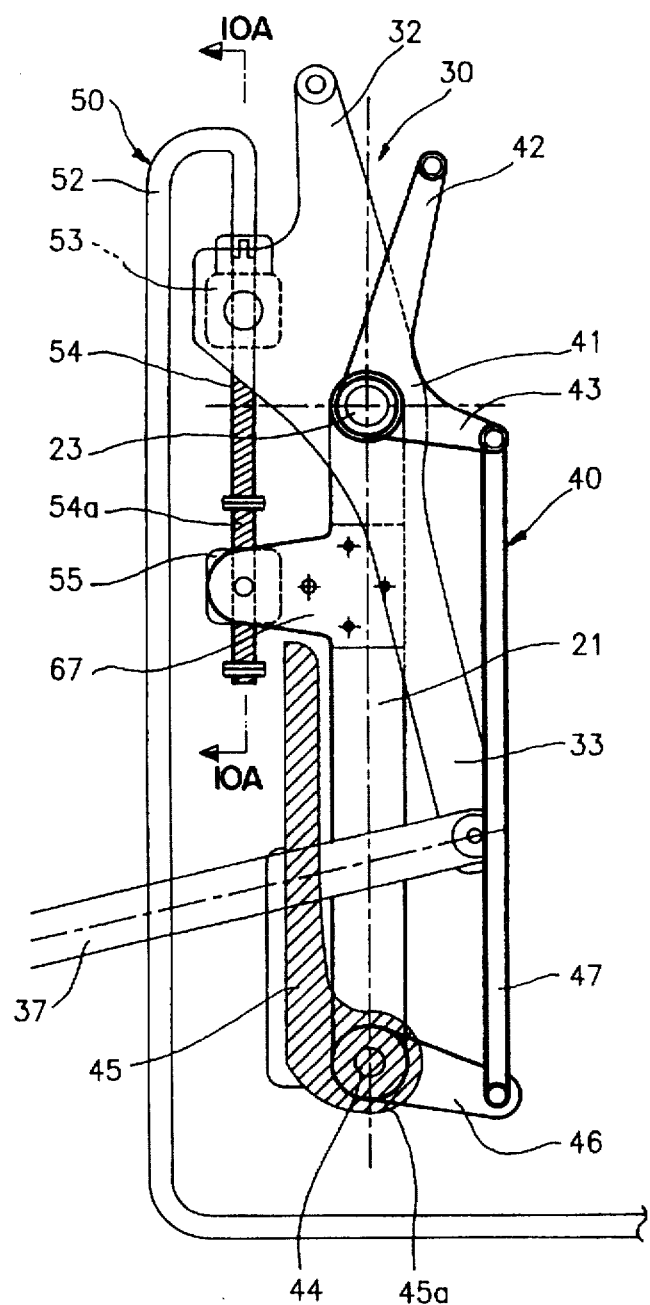
FIG. 7 is a cross-sectional view of FIG. 6 taken along line A—A.
Figure 9A:
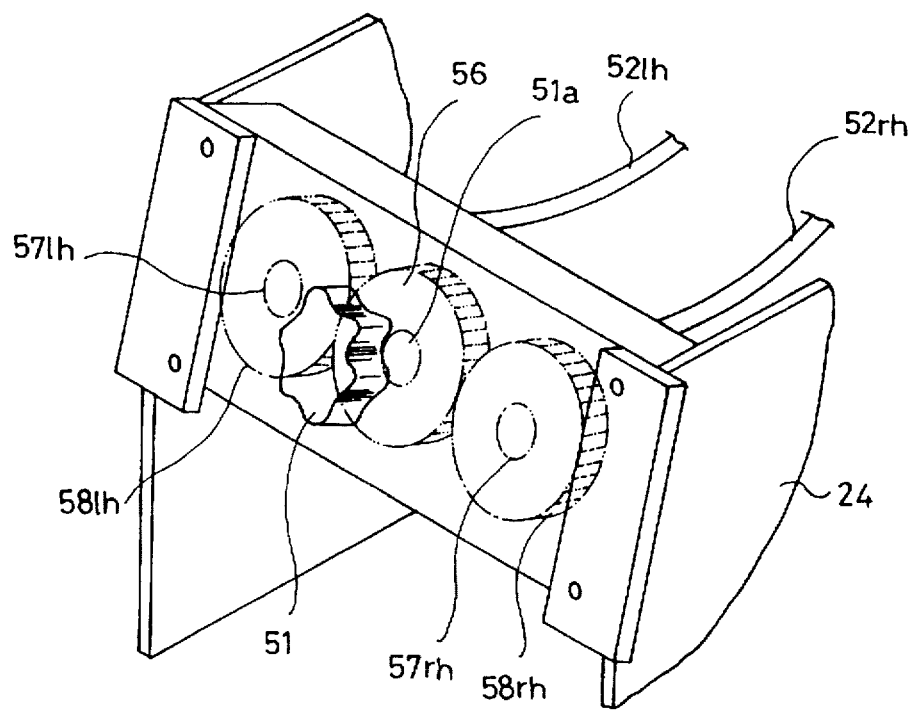
Figure 9B:
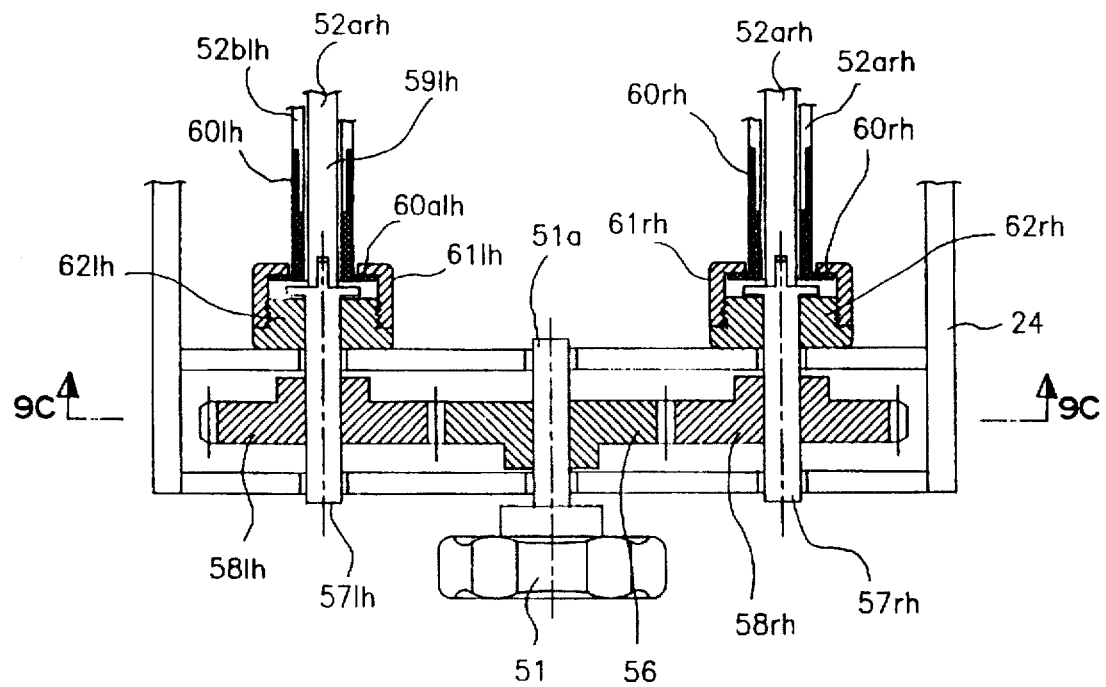
Figure 9C:
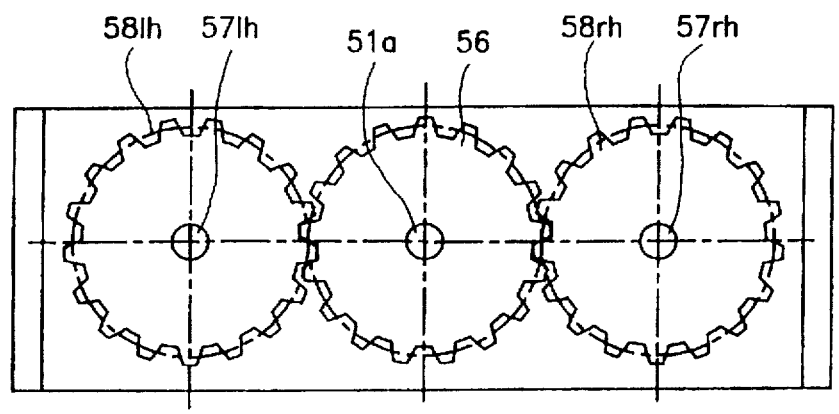
Figure 9D:
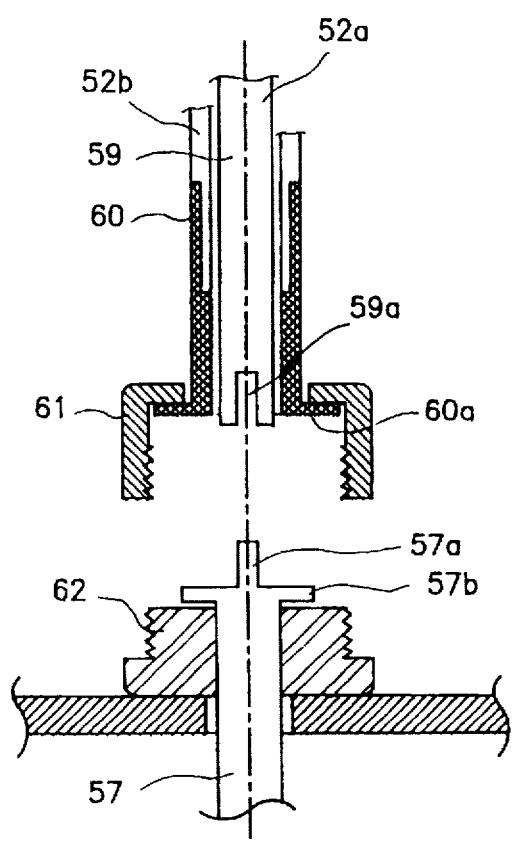
Figure 10A:
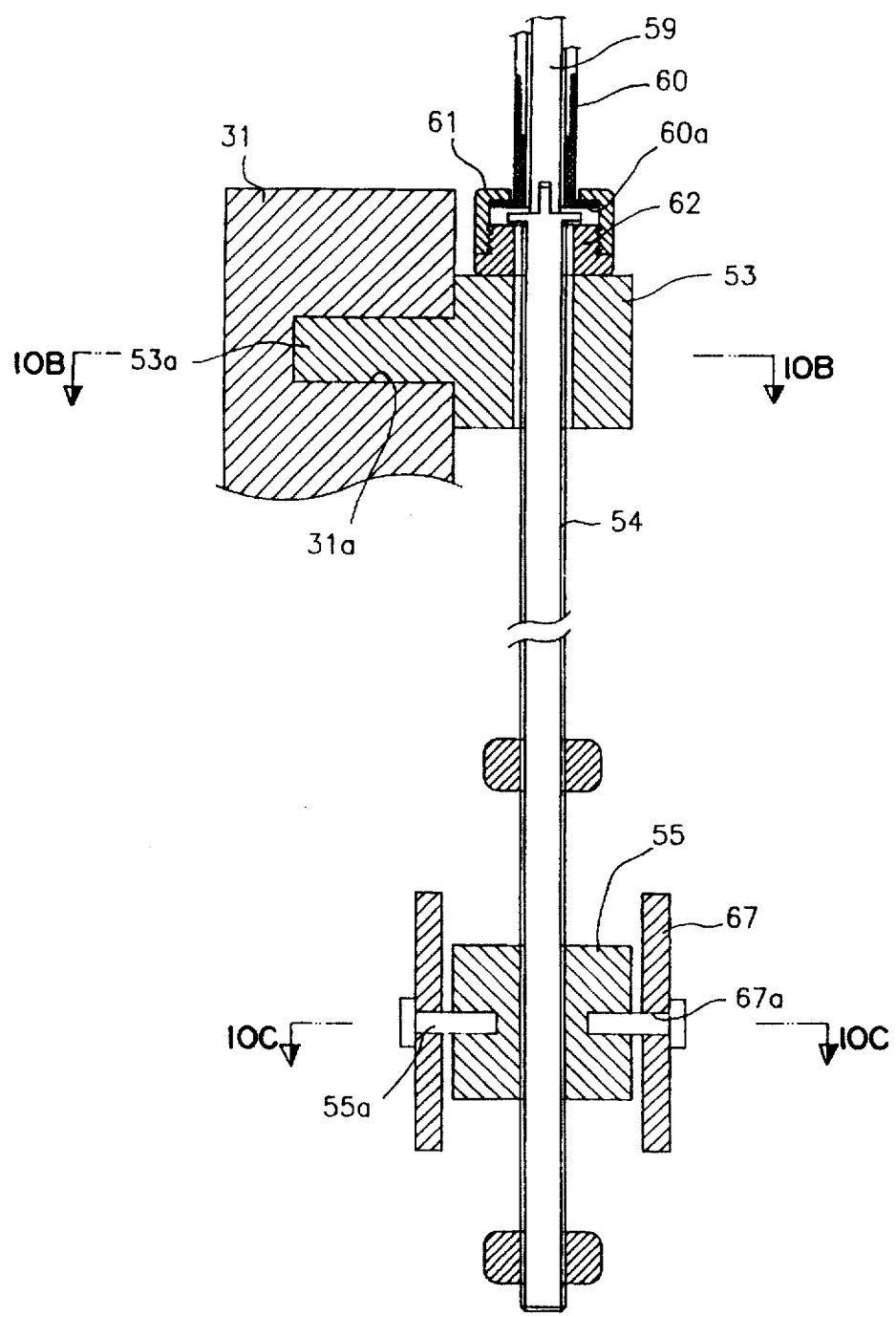
Figure 10B:
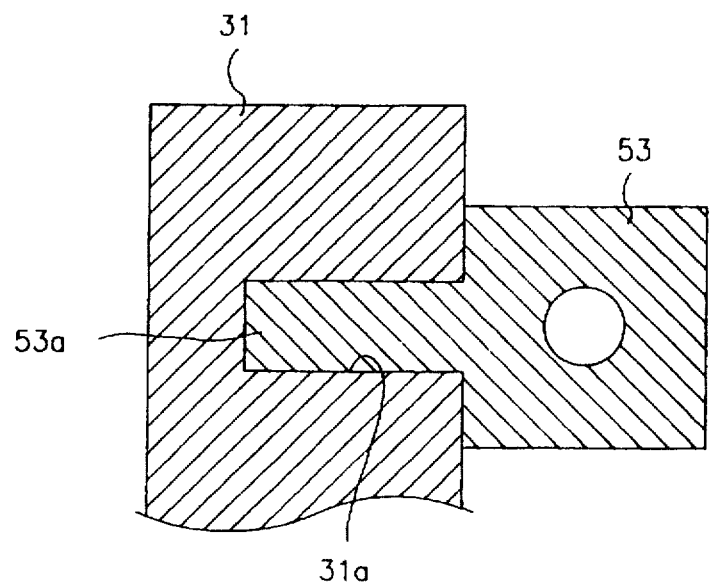
Figure 10C:
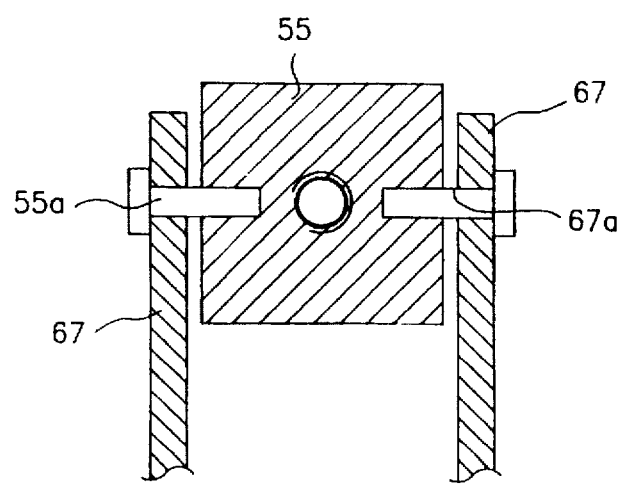
Figure 11:
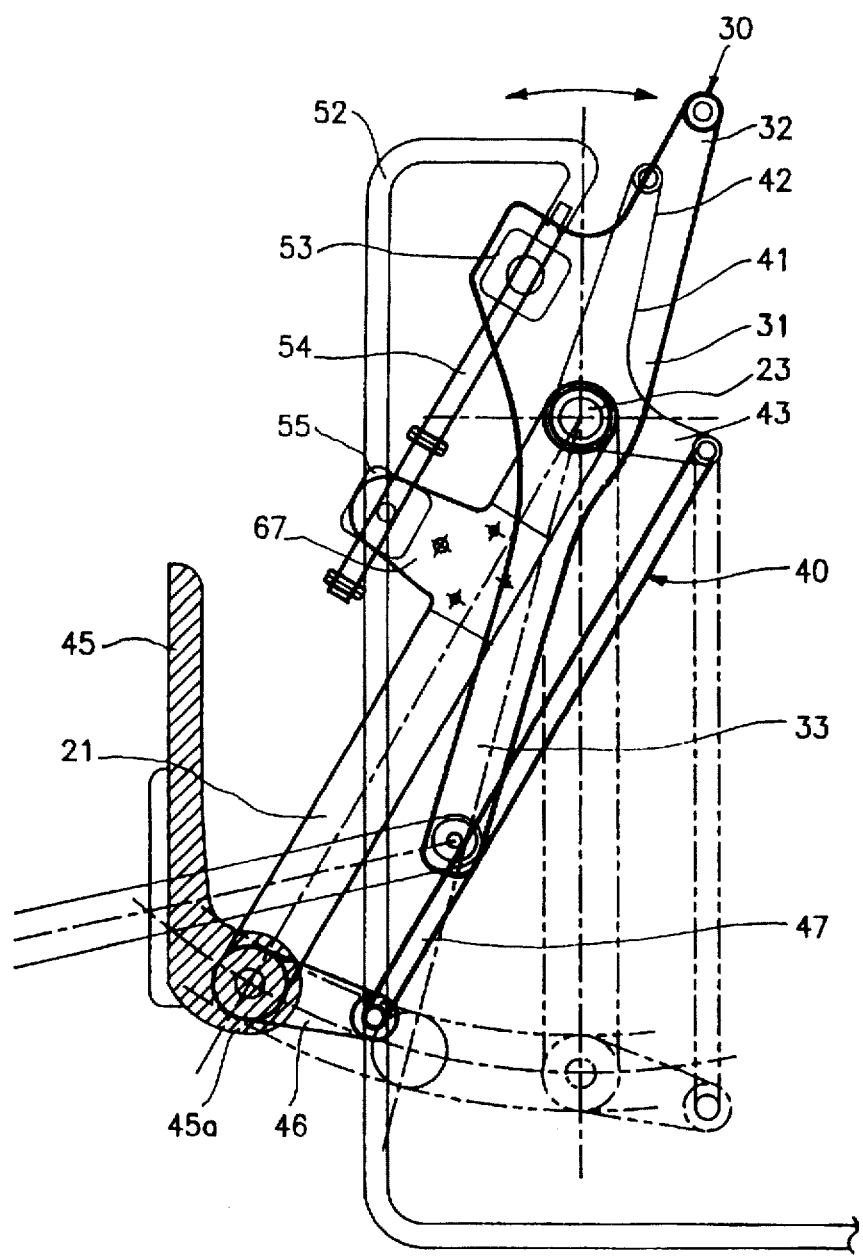
Figure 12:
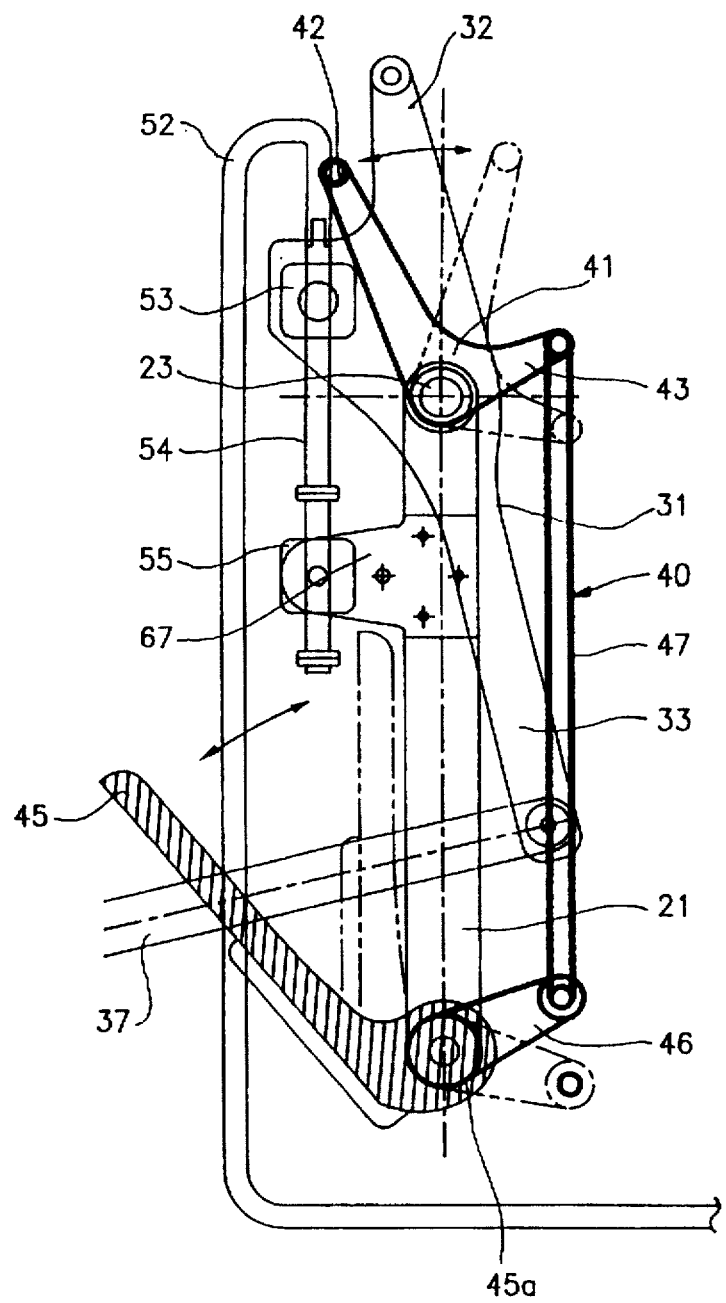
Figures 13A, 13B:
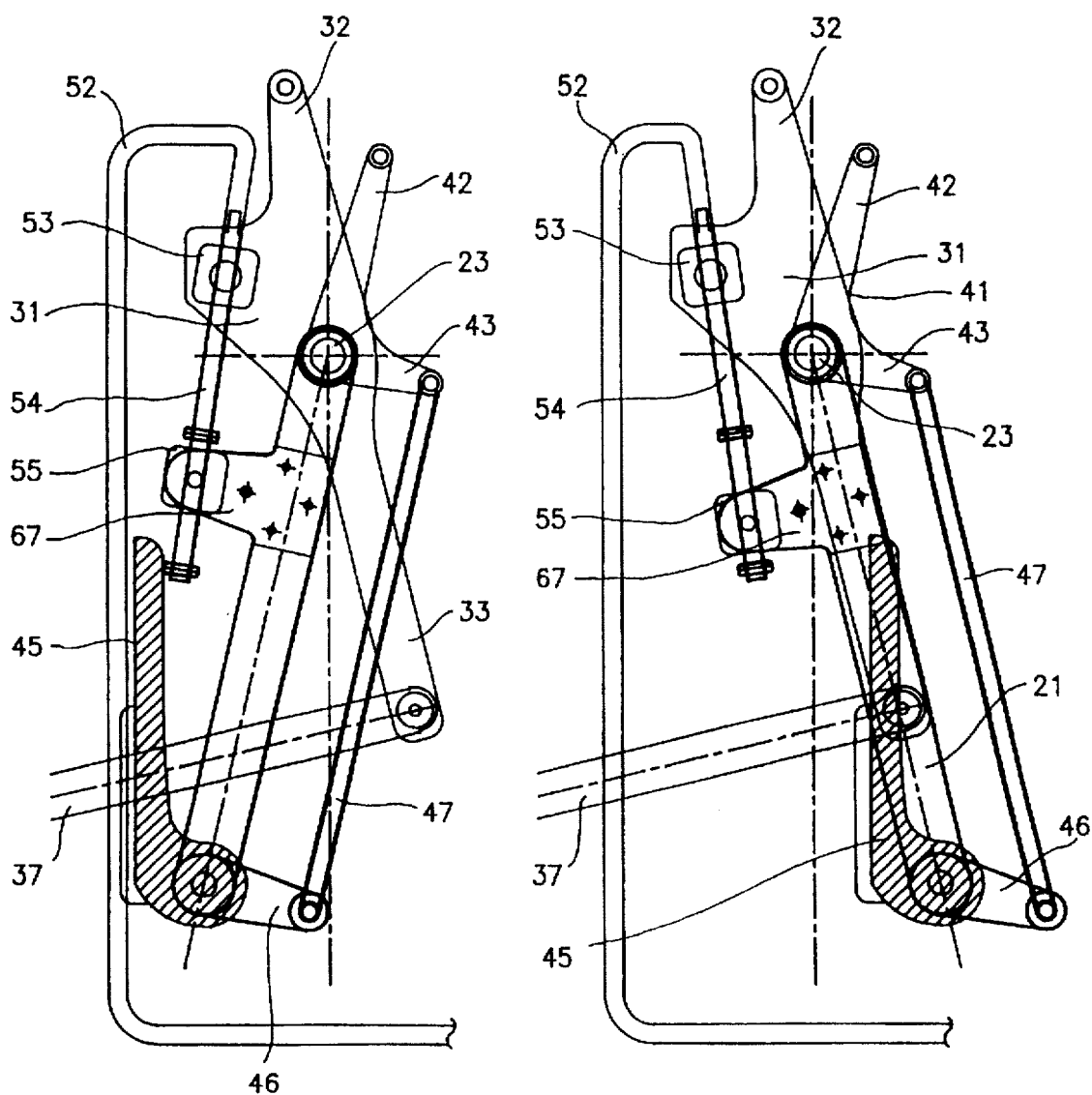

FIGS. 9A–9D show the connection of the control handle and the control flexible cable of the pedal position controller of the present invention, especially, FIG. 9A illustrating the exterior perspective view thereof, FIG. 9B cross-sectional view thereof, FIG. 9C a sectional view of FIG. 9B taken along line B—B, and FIG. 9D an enlarged sectional view of the connection of the transmission axes and control flexible cables;

FIGS. 10A, 10B and 10C show the coupling of the control screw rods, connection arms and pedal bodies of the pedal position controller, especially, FIG. 10A showing a sectional view of FIG. 7 taken along line C—C; FIG. 10B a sectional view of FIG. 10A taken along line D—D, and FIG. 10C a sectional view of FIG. 10A taken along line E—E;

FIG. 11 is a side view of showing the operation of the rudder and steering mechanism of the pedal assembly to which the present invention is employed;

FIG. 12 is a side view of showing the operation of the brake of the pedal assembly to which the present invention is employed; and FIGS. 13A and 13B show states of controlling the position of the pedal assembly of the present invention, FIG. 13A showing a side view in which the pedal assembly becomes farther away from the cockpit, and FIG. 13B a side view in which the pedal assembly becomes closer to the cockpit.

DETAILED DESCRIPTION OF THE INVENTION

Hereinafter, the brake rudder pedal system for a light aircraft of the present invention will be described in detail with reference to the attached drawings. In the following description, reference characters fr, rr, lh, and rh indicate the frontward, rearward, leftward and rightward directions, respectively.

Figure 1:
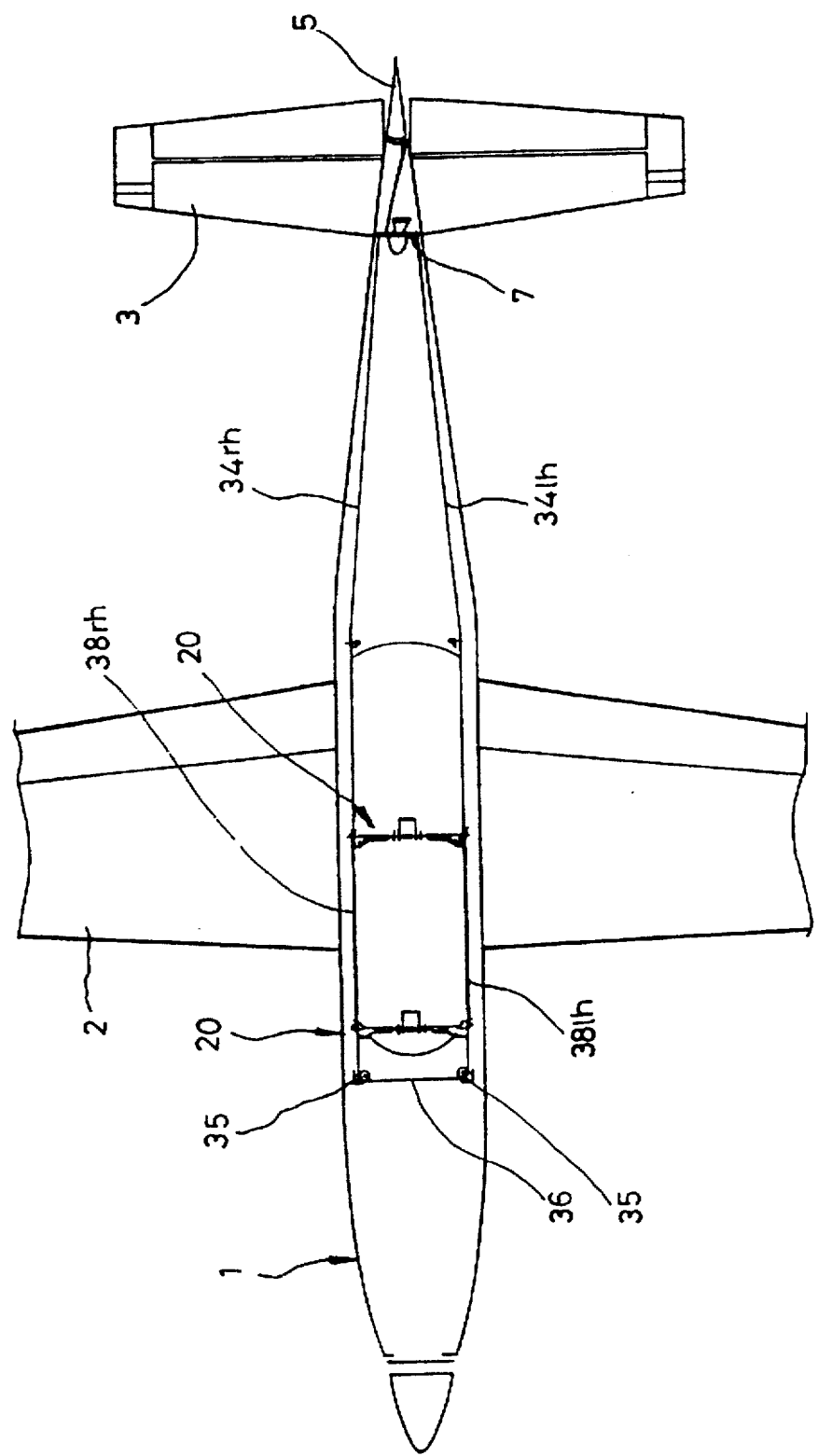
FIG. 1 is a schematic plan view of a light aircraft on which the system of the present invention is mounted.
Figure 2:
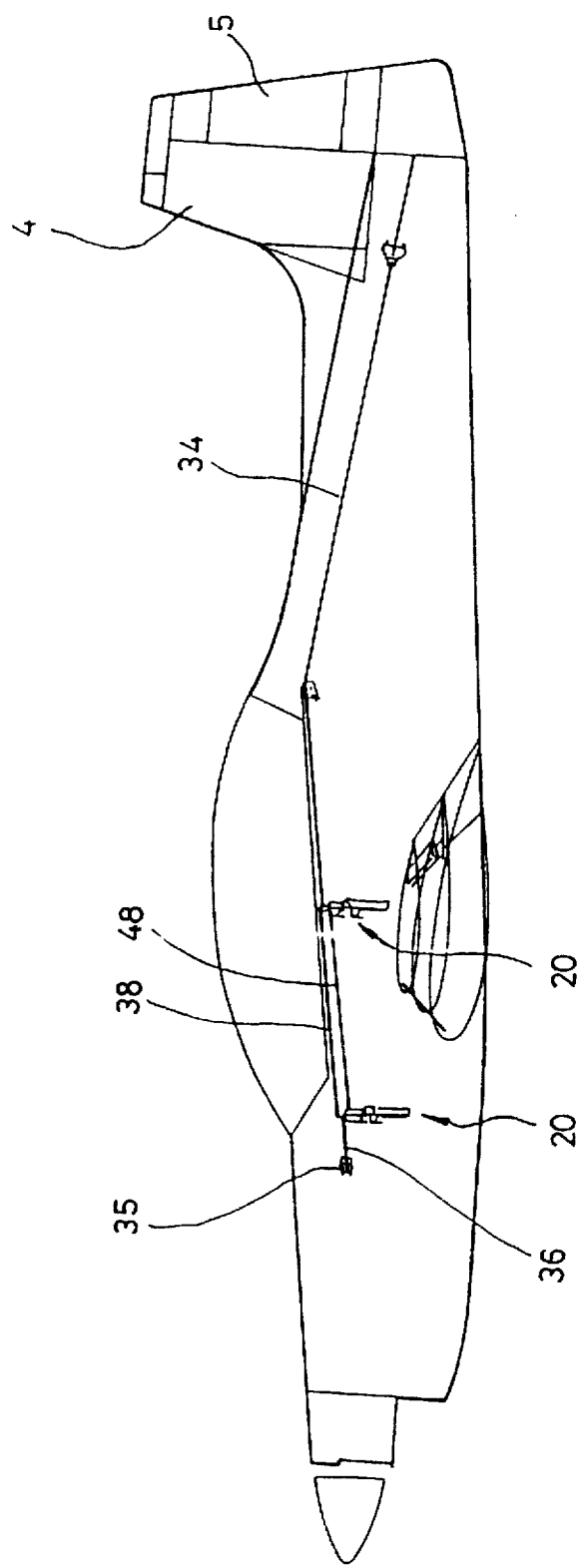
FIG. 2 is a schematic side view of a light aircraft on which the system of the present invention is mounted.
Figure 3:
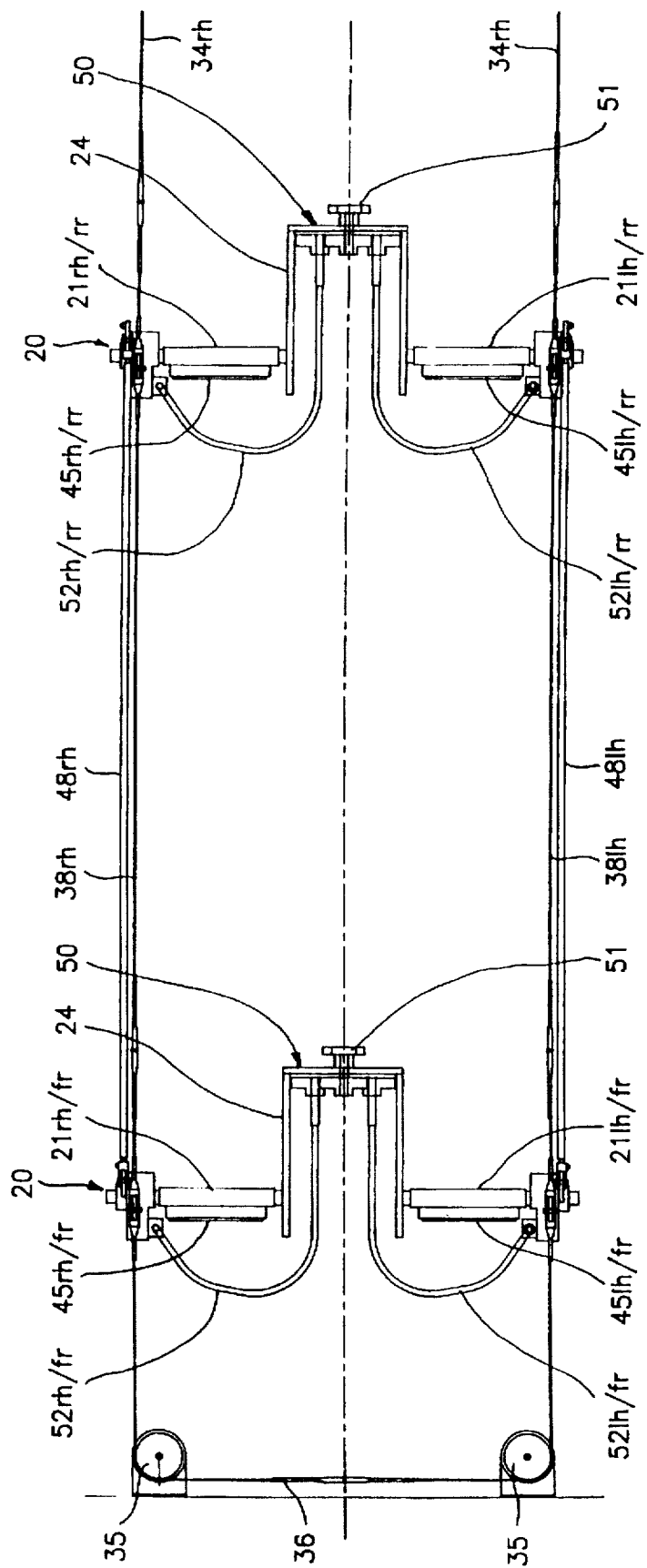
FIG. 3 is a partially enlarged view of FIG. 1.
Figure 4:
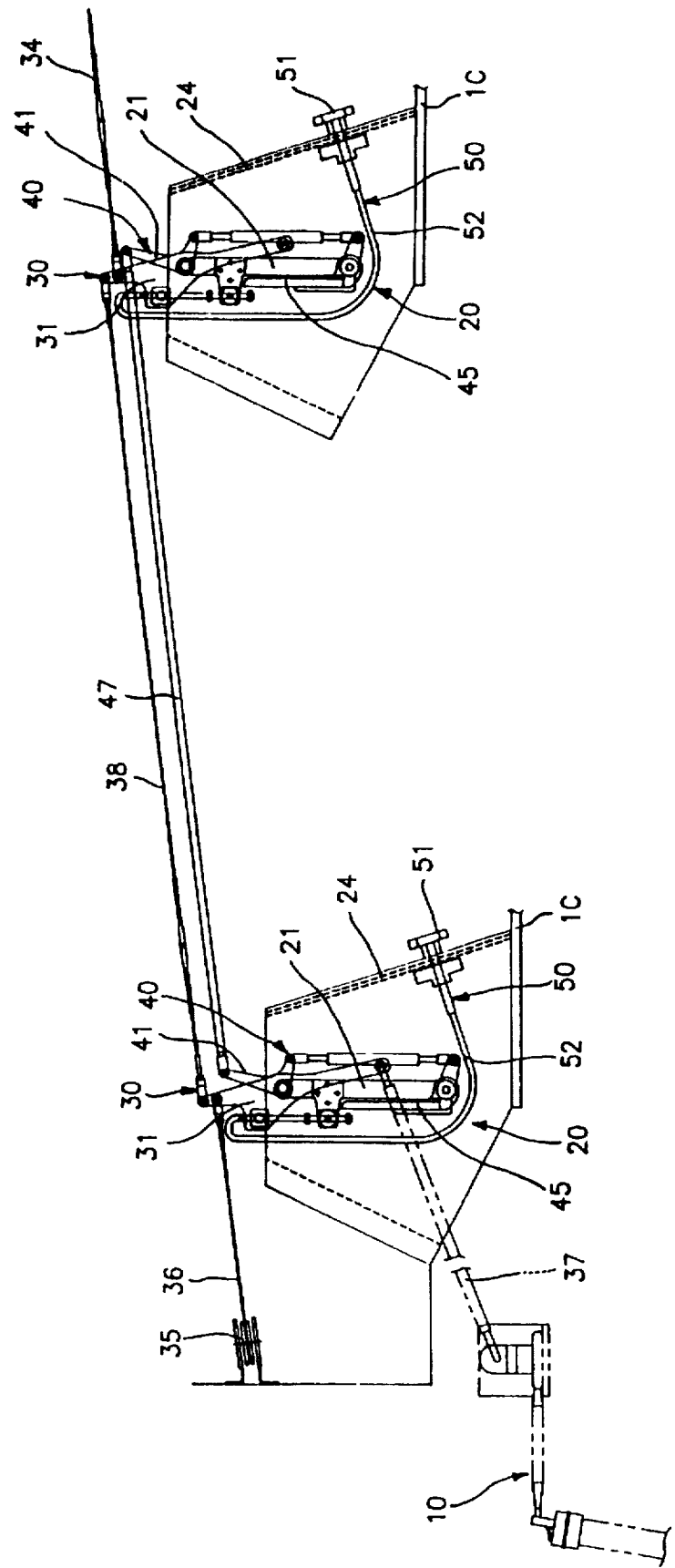
FIG. 4 is a partially enlarged view of FIG. 2.

FIGS. 1 and 2 show a two seat type light aircraft to which the present invention is employed. As shown in these drawings, the aircraft has a hull 1 with swept-back wings 2, horizontal stabilizers 3 and vertical stabilizers 4, a rudder 5 for converting the direction of the flying leftwarly and rightwardly during flight, and landing gears (not shown) for takeoff or landing.

Figure 5:
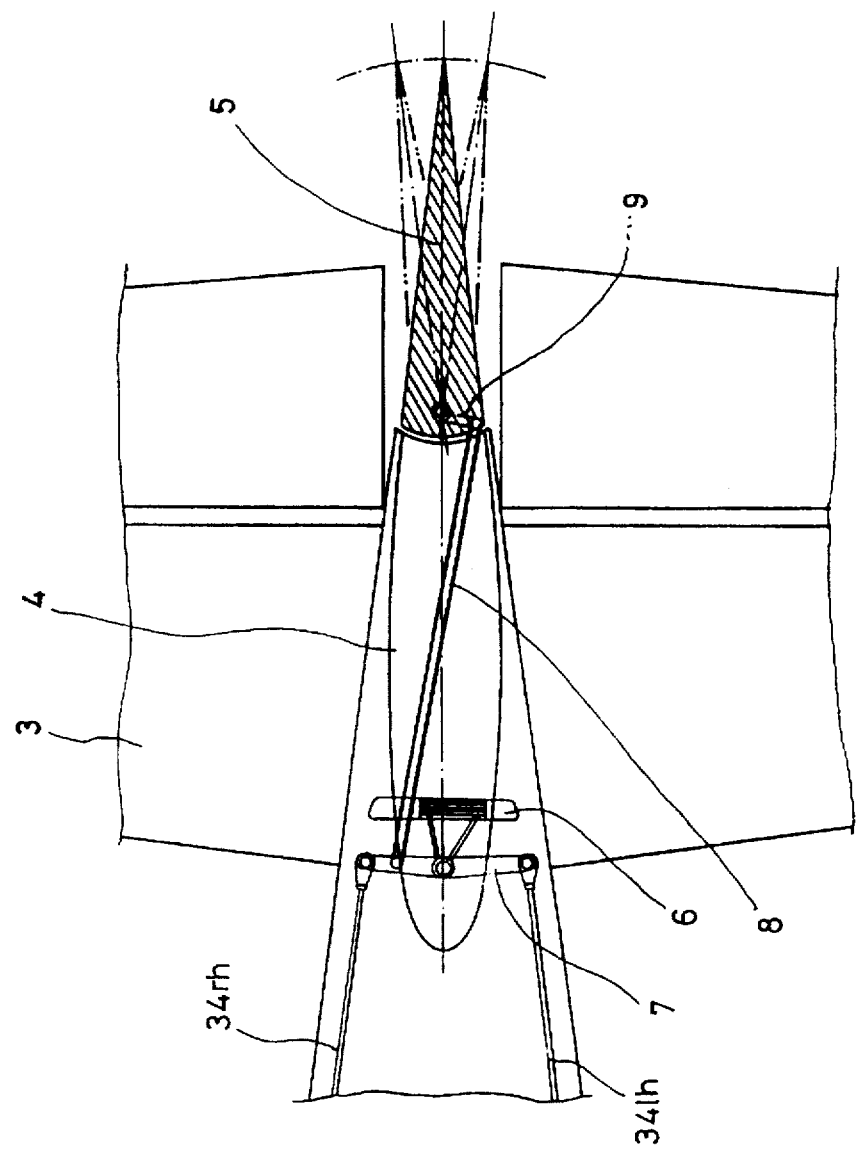
FIG. 5 is an enlarged plan view of the vertical stabilizer.

Referring to FIG. 5, in front of the rudder 5, a bellcrank 7 rotatably supported by a bracket 6 is disposed under the vertical stabilizer 4. A rudder rod 8 is connected by a fin to the bellcrank 7 at a position deviated from the rotation center thereof. The rudder rod 8 is fixed to the lower portion of rudder 5 and connected by a fin to the end of a horizontally extending rudder arm 9.

The landing gears includes a nose landing gear and a rear-wheel landing gear (not shown). The nose landing gear is constructed to be driven leftwardly and rightwardly by a steering mechanism 10 in order to convert the running direction on the earth. This gear has a brake mechanism (not shown).

The rudder 5 and the nose landing gear are engaged in the same direction during running on the earth in a general aircraft. During flight, the nose landing gear is taken into the hull 1, the nose landing gear does not operate but rudder 5 does.

The rudder 5, the nose landing gear, and the brake are manipulated when a pilot presses or releases a corresponding pedal by his feet. For this purpose, as shown in FIGS. 1–4, a pedal assembly 20 for operating them is provided in front of the cockpit.

In the drawings, the construction of a two seat type aircraft is illustrated in which pedal assembly 20 is disposed in front of the front and rear cockpits, respectively, and the pedal assemblies are connected to each other.

Figure 6:
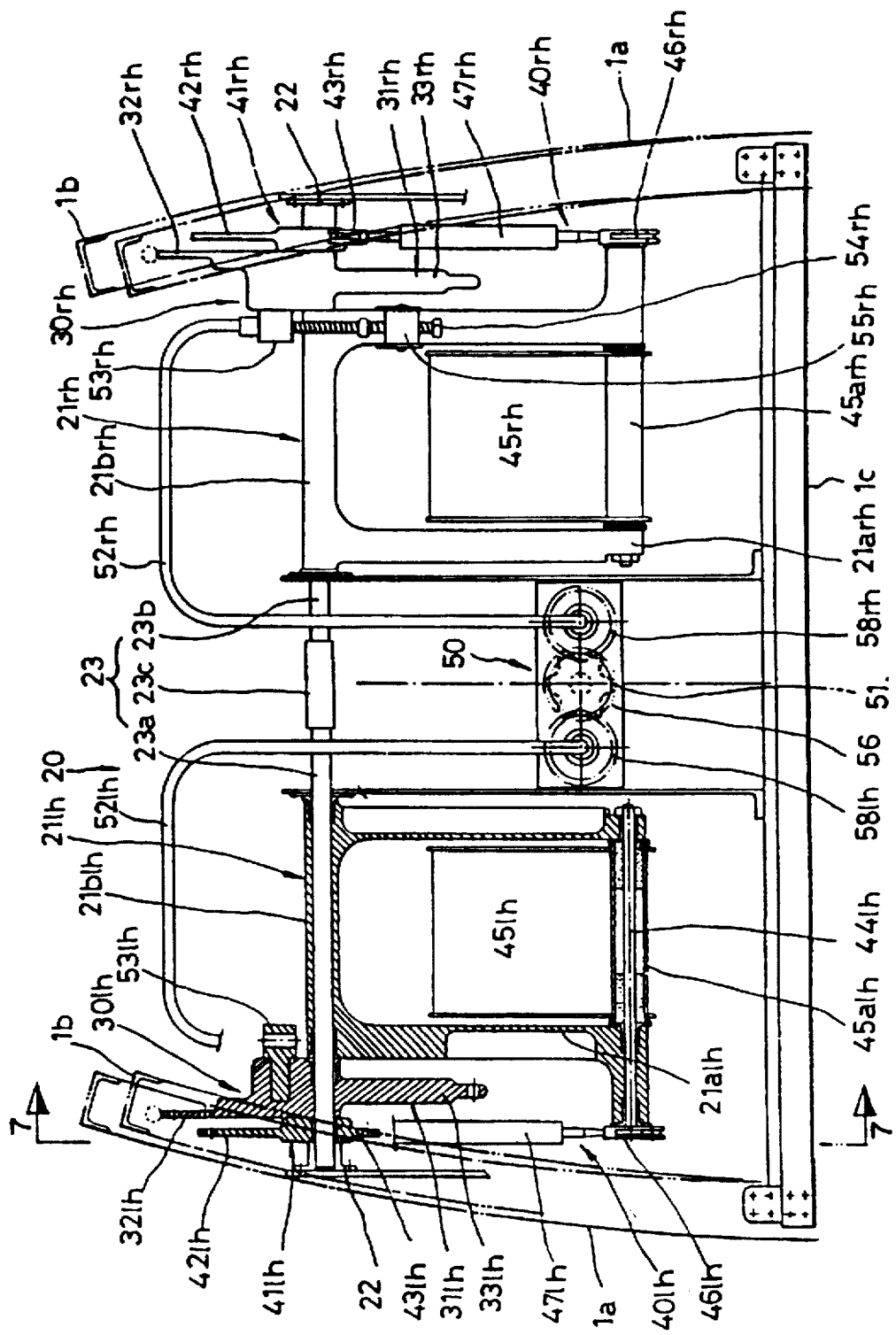
FIG. 6 is a rear view from the cockpit, of the pedal assembly to which the system of the present invention is employed and which is mounted on the hull of the light aircraft.
Figure 8:
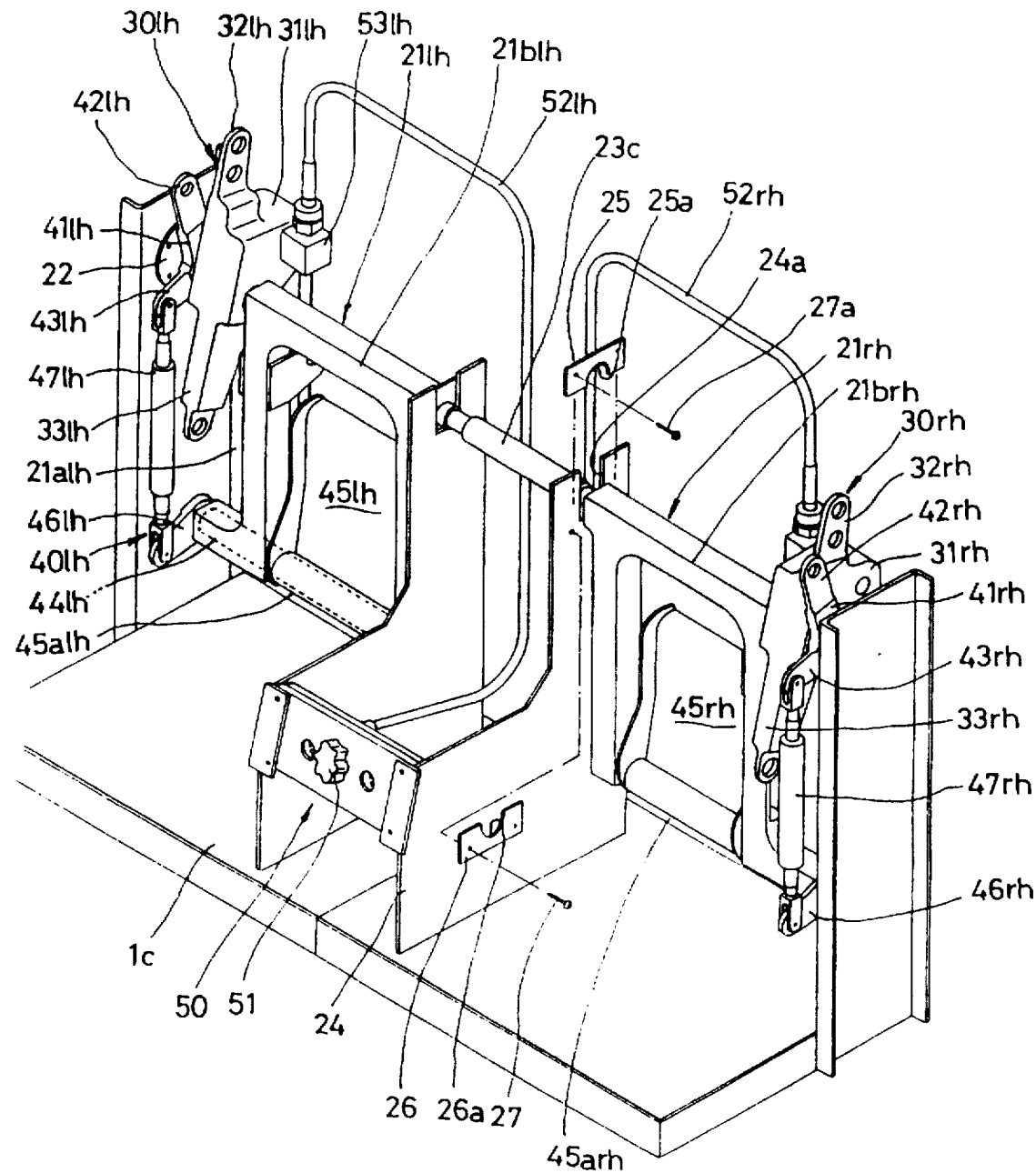
FIG. 8 is a perspective view of the pedal assembly to which the system of the present invention is employed.

Referring to FIGS. 6, 7 and 8, pedal assembly 20 comprises a pair of pedal bodies 21*lh* and 21*rh* rotatably supported between hull frames 1*b* that support a skin panel 1*a* forming the hull 1 of the light aircraft, rudder and steering operation members 30*lh* and 30*rh* for manipulating the rudder 5 and a steering mechanism 10 which are connected to pedal bodies 21*lh* and 21*rh*, brake operation members 40*lh* and 40*rh* disposed at the pedal bodies 21*lh* and 21*rh* and for operating the brake mechanism, and pedal position controller members 50*lh* and 50*rh* for adjusting the position of the pedal bodies 21*lh* and 21*rh*.

As shown in FIG. 8, the pedal bodies 21*lh* and 21*rh* are made in the form of TT in which the top of vertical portions 21*alh* and 21*arh* is connected to connecting portions 21*blh* and 21*brh* and whose bottom is opened. The connecting portions 21*blh* and 21*brh* are supported by the support shaft 23 fixed by bracket 22 and transversing hull frame 1*b*, and thus are rotatable forwardly and rearwardly.

The support shaft 23 is supported by the top of a pair of gauge board covers 24 whose intermediate portion is formed uprightly on a floor 1*c*. In the drawings, the support shaft is constructed with two shaft members 23*a* and 23*b* whose outer ends are fixed to hull frames 1*b*, and a connection member 23*c* for fixedly connecting the inner ends of shaft members 23*a* and 23*b*.

Referring again to FIG. 8, a U-shaped support cavity 24*a* is formed on the top of gauge board cover 24. Upper and lower fixed pieces 25 and 26 having semi-circular cavities 25*a* and 26*a* on their sides are disposed so that the support shaft is supported by a circular hole formed with semi-circular cavities 25*a* and 26*a* of the fixed pieces 25 and 26.

The fixed pieces 25 and 26 are to be secured by fastening screws 27*a* and 27*b* on the top of gauge board cover 24. In assembly, the lower fixed piece 26 is secured on gauge board cover 24, the lower portion of the support shaft 23 is fitted into semi-circular cavity 26 of lower fixed piece 26, and then upper fixed piece 25 is fixedly disposed. By doing so, the upper portion of support shaft 23 comes into a tight contact with semi-circular cavity 25*a* of upper fixed piece 25. In disassembly for repairing, only upper fixed piece 25 is separated and taken apart. This facilitates the assembly and separation of the pedal assembly.

As shown in FIGS. 6, 7 and 8, rudder and steering operation members 30*lh* and 30*rh* comprise a pair of connection arms 21*lh* and 31*rh* whose intermediate portion is rotatably supported to support shaft 23 outside pedal bodies 21*lh* and 21*rh* and which integrally have first arms 31*lh* and 32*rh* extending upward and second arms 33*lh* and 33*rh* extending downward, a pair of rudder operating flexible cables 34*lh* and 34*rh* connected to first arms 32*lh* and 32*rh* of connection arms 31*lh* and 31*rh* and to both ends of bellcrank 7, a moving-left-and-right flexible cable 36 connected to left and right first arms 32*lh* and 32*rh* and inversely guided by guide sheaves 35*lh* and 35*rh* disposed on front both sides of the cockpit, and steering rods 37*lh* and 37*rh* of steering mechanism 10 connected to second arms 33*lh* and 33*rh*.

In case of two seat type aircraft, the front and rear first arms 32*lh/fr* and 32*rh/fr* and 32*lh/rr* and 32*rh/rr* are connected by moving-forward-and-rearward flexible cables 38*lh* and 38*rh*. Cable 36 is connected to front first arms 32*lh/fr* and 32*rh/fr*. Rear first arms 32*lh/rr* and 32*rh/rr* are connected to bellcrank 7 by rudder operating flexible cables 34*lh* and 34*rh*. They are operated in the same way both at front and rear. In case of one seat type aircraft, first arms 32*lh* and 32*rh* of connection arms 31*lh* and 31*rh* are directly connected to bellcrank 7 by rudder operating flexible cables 34*lh* and 34*rh*.

In case of two seat type aircraft, steering rods 37*lh* and 37*rh* are connected only to front first arms 32*lh/fr* and 32*rh/fr*. Here, front and rear first arms 32*lh/fr* and 32*rh/fr* and 32*lh/rr* and 32*rh/rr* are connected with moving-forward-and-rearward flexible cables 38*lh* and 38*rh* to manipulate rear connection arms 31*lh/rr* and 31*rh/rr*. Front connection arms 31*lh/fr* and 31*rh/fr* are connected thereto in order to operate steering rods 37*lh* and 37*rh*.

Pedal bodies 21*lh* and 21*rh* and connection arms 31*lh* and 31*rh* are connected by a control screw nods 54*lh* and 54*rh* forming a later-mentioned pedal position controller member 50.

As shown in FIGS. 6, 7 and 8, brake operation member 40 comprises brake levers 41lh and 41rh rotatably supported by support shaft 23 and connected to the brake mechanism and having upper first arms 42lh and 42rh and lower second arms 43lh and 43rh, rotation shafts 44lh and 44rh disposed between the lower openings of pedal bodies 21lh and 21rh, a pair of brake pedals 45lh and 45rh whose lower portion is fixed to rotation shafts 44lh and 44rh, connection arms 46lh and 46rh fixed to the outer extending portion of rotation shafts 44lh and 44rh, and a connection rods 47lh and 47rh pivoted between the front end of connection arms 46lh and 46rh and the front end of second arms 43lh and 43rh.

At the bottom of brake pedals 45lh and 45rh, cylindrical portions 45alh and 45arh into which rotation shafts 44lh and 44rh are fitted are formed fixedly and integrally. When the pilot presses cylindrical portions 45alh and 45arh, pedal bodies 21lh and 21rh are moved forwardly and rearwardly to thus move the rudder 5 leftwardly and rightwardly.

The first arms 42lh and 42rh of front and rear brake levers 41lh and 41rh are connected to connection rods 48lh and 48rh so that when one brake pedal is pressed, the other is moved together to manipulate the brake mechanism.

Referring to FIGS. 6–10, pedal position controller member 50 comprises a control handle 51 rotatably disposed on the front surface of gauge board cover 24, transmission flexible cables 52lh and 52rh for transmitting the rotation force of control handle 51, control screw rods 54lh and 54rh rotatably supported to support blocks 53lh and 53rh that are coupled to connection arms 31lh and 31rh to be thereby rotatable forward and rearward, the control screw rods having their tops being connected to the end of transmission flexible cables 52lh and 52rh, the control screw rods having screws 54alh and 54arh at their lower portions, and control nuts 55lh and 55rh supported by pedal bodies 21lh and 21rh to be rotatable forward and rearward at a position spaced apart from the rotation center of the pedal bodies, the control nuts being protruded toward the axle and screw-coupled by control screw rods 54lh and 54rh.

Referring to FIGS. 9A–9D, a driving gear 56 is provided to handle axis 51a of control handle 51 and transmission axes 57lh and 57rh are disposed to both sides thereof. Then, transmission gears 58lh and 58rh engaging with driving gear 56 are disposed on transmission axes 57lh and 57rh, and transmission flexible cables 52lh and 52rh are connected to transmission axes 57lh and 57rh. According to this configuration, when control handle 51 rotates left and right, pedal bodies 21lh and 21rh are moved forward and rearward at the same time.

In connecting transmission axes 57lh and 57rh and flexible cables 52lh and 52rh, as shown in FIG. 9D, connection rods 59lh and 59rh having rectangular connection recesses 59alh and 59arh are fixedly welded to the end of cable core wires 52alh and 52arh. Rectangular connection protrusions 57alh and 57arh inserted into rectangular connection recesses 59alh and 59arh are formed at the end of transmission axes 57lh and 57rh. By fitting rectangular connection protrusions 57alh and 57arh into rectangular connection recesses 59alh and 59arh, transmission axes 57lh and 57rh and connection rods 59lh and 59rh are rotated together. Connection tubes 60lh and 60rh having flanges 60alh and 60arh are coupled to the end of cable skins 52blh and 52brh. With cap nuts 61lh and 61rh that hook flanges 60alh and 60arh of connection tubes 60lh and 60rh, and with bolts 62lh and 62rh through which control screw rods 54lh and 54rh are penetrated, cap nuts 61lh and 61rh are fastened by bolts 62lh and 62rh to fix cable skins 52blh and 52brh so that cable core wires 52alh and 52arh transmit the rotation force of transmission axes 57lh and 57rh while cable skins 52blh and 52brh are fixed.

Here, flanges 57blh and 57brh are formed on transmission axes 57lh and 57rh in order to prevent bolts 62lh and 62rh from being detached freely. The screw portion of cap nuts 61lh and 61rh is longer than that of bolts 62lh and 62rh so that flanges 60alh and 60arh of connection tubes 60lh and 60rh and flanges 57blh and 57brh of transmission axes 57lh and 57rh are spaced by a predetermined distance even when cap nuts 61lh and 61rh are fully fastened by bolts 62lh and 62rh.

Turning to FIG. 10, control screw rods 54lh and 54rh are supported in such a manner that their tops are rotated with respect to support blocks 53lh and 53rh only at their original positions. Axial protrusions 53alh and 53arh are formed on one side of support blocks 53lh and 53rh. Axial protrusions 53alh and 53arh are fitted into axial recesses 31alh and 31arh formed in connection arms 31lh and 31rh so that support blocks 53lh and 53rh are moved forward and rearward.

In fixedly connecting the end of transmission flexible cables 52lh and 52rh and the top of control screw rods 54lh and 54rh, as shown in FIGS. 10A, 10B and 10C, connection rods 63lh and 63rh having rectangular connection recesses 63alh and 63arh are fixedly welded to the end of cable core wires 52alh and 52arh. Rectangular connection protrusions 54blh and 54brh inserted into rectangular connection recesses 63alh and 63arh are formed on the top of control screw rods 54lh and 54rh. Rectangular connection protrusions 54blh and 54brh are fitted into rectangular connection recesses 63alh and 63arh so that connection rods 63lh and 63rh and control screw rods 53lh and 53rh are connected to be moved together. Connection tubes 64lh and 64rh having flanges 64alh and 64arh are coupled to the end of cable skins 52blh and 52brh. With cap nuts 65lh and 65rh that hook flanges 64alh and 64arh of connection tubes 64lh and 64rh, and with bolts 66lh and 66rh through which control screw rods 54lh and 54rh are penetrated, cap nuts 65lh and 65rh are fastened by bolts 66lh and 66rh to fix cable skins 52blh and 52brh so that cable core wires 52alh and 52arh transmit rotation force to control screw rods 54lh and 54rh while cable skins 52alh and 52arh are fixed.

Here, flanges 54clh and 54crh are formed on the top of control screw rods 54lh and 54rh in order to prevent bolts 66lh and 66rh from being detached freely. The screw portion of cap nuts 65lh and 65rh is longer than that of bolts 66lh and 66rh so that flanges 64alh and 64arh of connection tubes 64lh and 64rh and flanges 54clh and 54crh of control screw rods 54lh and 54rh are spaced by a predetermined distance even when cap nuts 65lh and 65rh are fully fastened by bolts 66lh and 66rh.

However, the present invention is not confined to this embodiment. Any structure of fixedly connecting the flexible cables and the rod-shaped members is allowable in which, for instance, rod-shaped transmission axes 57lh and 57rh, control screw rods 54lh and 54rh and transmission flexible cables 52lh and 54rh are directly welded.

Protrusions 55alh and 55arh are formed on both sides of control nuts 55lh and 55rh. Protrusions 55alh and 55arh are fitted into axial holes 67alh and 67arh of a pair of brackets 67lh and 67rh fixed to pedal bodies 21lh and 21rh so that control nuts 55lh and 55rh are movable forward and rearward.

In this configuration, the flexible cable indicates a cable, in which steel wire is inserted into a flexible skin tube. The flexible skin tube has no relation with operation but the internal steel wire does.

The operation of the rudder, steering and brake mechanisms of a light aircraft to which the present invention is employed will be described below.

The visual line of FIG. 11 indicates a neutral position in which pedal bodies 21*lh* and 21*rh* are not pressed. In this state, rudder 5 is maintained to conform to the axle so that the aircraft flies straight forward.

In order to rotate to the right during flight, when cylindrical portion 45*arh*, the lower portion of brake pedal 45*rh* disposed in right pedal body 21*rh*, is pressed, pedal body 21*rh* is moved forward centering on support shaft 23, as shown in the full line of FIG. 11, and thus connection arm 31*rh* connected to pedal body 21*rh* is moved by control screw rod 54*rh* of pedal position controller member 50. Then, upper first arm 32*rh* moves rearward to pull moving-left-and-right flexible cable 36 connected thereto. Accordingly, flexible cable 36 pulls forward first arm 32*lh* of left connection arm 31*lh* so that first arm 32*lh* of left connection arm 31*lh* moves forward.

Here, in case of one seat type aircraft, first arm 32*lh* of left connection arm 31*lh* and bellcrank 7 are directly connected by rudder operating flexible cables 34*lh* and 34*rh* so that the left portion of bellcrank 7 is pulled and its right portion is pushed rearward. In case of two seat type, first arm 32*lh/fr* of front left connection arm 31*lh/fr* moves forward so that first arm 32*lh/rr* of rear left connection arm 31*lh/rr* connected by moving-forward-and-rearward flexible cables 38*lh* and 38*rh* moves forward. Through rudder operating flexible cable 34*lh* connected to first arm 32*lh/rr* of rear left connection arm 31*lh/rr*, the left portion of bellcrank 7 is pulled forward and its right portion is pushed rearward. Accordingly, rudder rod 8 connected thereto is pushed.

Rudder rod 8 pushes rudder arm 9 rearward so that, because rudder arm 9 extends to the left of rudder 5, rudder 5 moves right to allow the aircraft to move right.

In case of moving left, left pedal body 21*lh* is pressed, and its operation is performed reversely from the above-explained case of moving right.

Hereinbefore, the operation of flying with the nose landing gear being taken into the hull of the aircraft has been described. In case that the light aircraft travels on the earth, because steering rods 37*lh* and 37*rh* are connected to second arms 33*lh* and 33*rh* of connection arms 31*lh* and 31*rh*, pedal bodies are manipulated so that the left and right movement of rudder 5 is carried out and the direction of the nose land gear is converted to change the travelling direction. When brake pedals 45*lh* and 45*rh* are pressed during flight on the earth, the brake mechanism operates to halt the nose landing gear and the rear-wheel landing gear.

Hereinafter, the procedure of controlling the pedal position of the present invention will be described.

FIG. 12 shows a state in which the pedal is in its neutral position. In this case, vertical portions 21*alh* and 21*arh* of pedal bodies 21*lh* and 21*rh* stay erect. In order to make the pedal farther away from the cockpit, when control handle 51 is turned left, driving gear 56 disposed in handle shaft 51*a* is rotated left, and left and right transmission gears 58*lh* and 58*rh* engaged therewith are turned right. Accordingly, transmission flexible cables 52*lh* and 52*rh* connected to transmission axes 57*lh* and 57*rh* are turned right to thus turn right control screw rods 54*lh* and 54*rh* fixedly connected to the end of the cables. As a result, control nuts 55*lh* and 55*rh* screw-fastened to screws 54*alh* and 54*arh* of control screw rods 54*lh* and 54*rh* are lifted according to the screws.

Here, control nuts 55*lh* and 55*rh* are protruded from pedal bodies 21*lh* and 21*rh* at a position spaced apart from support shaft 23. Therefore, as shown in FIG. 13A, moment is produced clockwise due to the distance from support shaft 23 and the protruded height of control nuts 55*lh* and 55*rh*. As shown in FIG. 13B, this moment moves pedal bodies 21*lh* and 21*rh* forward centering on support shaft 23 so that brake pedals 45*lh* and 45*rh* and cylindrical portions 45*alh* and 45*arh* thereunder become farther from the cockpit.

In order to make the pedal closer to the cockpit, in the state of FIG. 13, when control handle 51 is turned right, driving gear 56 disposed in handle shaft 51*a* is turned right so that left and right transmission gears 58*lh* and 58*rh* engaged therewith are turned left. Accordingly, transmission flexible cables 52*lh* and 52*rh* connected to transmission axes 57*lh* and 57*rh* are turned left to thus turn left control screw rods 54*lh* and 54*rh* fixedly connected to the end of the cables. As a result, control nuts 55*lh* and 55*rh* screw-fastened to screws 54*alh* and 54*arh* of control screw rods 54*lh* and 54*rh* are lowered according to the screws.

According to this operation, while pedal bodies 21*lh* and 21*rh* are turned counterclockwise in FIG. 13A, brake pedals 45*lh* and 45*rh* and cylindrical portions 45*alh* and 45*arh* thereunder become closer to the cockpit, as shown in FIG. 13B.

In the procedure of controlling the pedal position, the moment acting to pedal bodies 21*lh* and 21*rh* are transmitted to connection arms 31*lh* and 31*rh* because connection arms 31*lh* and 31*rh* are connected to pedal bodies 21*lh* and 21*rh* by control screw rods 54*lh* and 54*rh*. However, moving-left-and-right flexible cable 36 and rudder operating flexible cables 34*lh* and 34*rh* are connected to first arms 32*lh* and 32*rh* of connection arms 31*lh* and 31*rh* to thereby form a loop so that connection arms 31*lh* and 31*rh* are fixed to the flexible cables and maintains the initial state without movement. In this case, only pedal bodies 21*lh* and 21*rh* move.

In this operation, control screw rods 54*lh* and 54*rh* are rotatably supported to support blocks 53*lh* and 53*rh* disposed in connection arms 31*lh* and 31*rh* to be movable forward and rearward, and control nuts 55*lh* and 55*rh* screw-fastened to screws 54*alh* and 54*arh* are disposed to pedal bodies 21*lh* and 21*rh* to be movable forward and rearward so that, according to the moving amount of pedal bodies 21*lh* and 21*rh*, support blocks 53*lh* and 53*rh* and control nuts 55*lh* and 55*rh* move forward and rearward as much as an angle at which control screw rods 54*lh* and 54*rh* are inclined. Through this procedure, the control of pedal position is performed smoothly without interruption.

As described above, in the present invention, the position of pedal is controlled fast and accurately only by turning the control handle leftward or rightward. In addition, the system of the present invention is simplified in structure and becomes lighter to be favorable to light aircraft. Further, the control handle is disposed on the gauge board that a pilot easily access any time and no separate locking device is required, to thereby control the position of the pedal fast and accurately according to the pilot's physical condition during flight as well as on the earth.

What is claimed is:

1. A brake rudder pedal system for a light aircraft having a pedal assembly comprising rudder and steering operation means for manipulating a rudder and steering mechanism, and brake operation means for operating a brake mechanism, said pedal assembly comprising:

a pair of pedal bodies whose tops are rotatably supported between hull frames;

said rudder and steering operation means being rotatably connected to said pedal bodies thereoutside, said means having upper first arms connected to a rudder operating flexible cable and to moving-left-and-right flexible cable, and lower second arms connected to the steering mechanism by a steering rod;

said brake operating means having a brake pedal whose lower portion is rotatably supported to said pedal bodies, and a brake lever connected to said brake pedal and for operating said brake mechanism; and pedal position controller means having a control handle rotatably disposed on a gauge board cover, a pair of transmission flexible cables rotated while connected to said control handle, a control nut supported to said pedal bodies to be movable forward and rearward, a support block supported to said connection arm to be movable forward and rearward, and a control screw rod supported to said support block while idling at its original position, said control screw rod being screw-fastened to said nut and whose top is fixedly connected to said transmission flexible cable.

2. The brake rudder pedal system for a light aircraft as claimed in claim 1, wherein the connection arm of said rudder and steering operating means is provided at front and rear and both sides by one pair, said first arms of the front and rear and left and right connection arms being connected by moving-forward-and-rearward flexible cable so that said rudder and steering operating mechanism is operated by manipulating one of said front and rear rudder and steering operating means.

3. The brake rudder pedal system for a light aircraft as claimed in claim 1, wherein said brake lever of said brake operating means is provided at front and rear and both sides by one pair, said brake levers being connected by a connection rod so that said brake mechanism is operated by manipulating one of said front and rear brake operating means.

4. The brake rudder pedal system for a light aircraft as claimed in claim 1, wherein one end of said left and right transmission flexible cables of said pedal position controller means is fixedly coupled to a transmission axis to which transmission gears engaged with both sides of driving gears fixed to a handle axis of said control handle are fixed.

5. The brake rudder pedal system for a light aircraft as claimed in claim 1, wherein connection rods having rectangular connection recesses are fixedly welded to both ends of the core wire of said transmission flexible cable, rectangular connection protrusions inserted into said one-side rectangular connection recesses are formed at one end of said transmission axes, rectangular connection protrusions fitted into said other-side rectangular connection recesses are formed on the top of said control screw rod, so that rotation force of said transmission axes is transmitted to said control screw rod through said transmission flexible cables.

6. The brake rudder pedal system for a light aircraft as claimed in claim 4, wherein connection rods having rectangular connection recesses are fixedly welded to both ends of the core wire of said transmission flexible cable, rectangular connection protrusions inserted into said one-side rectangular connection recesses are formed at one end of said transmission axes, rectangular connection protrusions fitted into said other-side rectangular connection recesses are formed on the top of said control screw rod, so that rotation force of said transmission axes is transmitted to said control screw rod through said transmission flexible cables.

7. The brake rudder pedal system for a light aircraft as claimed in claim 5, wherein connection tubes having flanges are coupled to both ends of the skin of said transmission flexible cables, and cap nuts that hook said flanges and bolts screw-fastened by said cap nuts and through which said transmission axes and control screw rods are penetrated are provided so that said cap nuts are fastened by said bolts to thereby rotate the core wire of said transmission flexible cables while their skins are fixed.

8. The brake rudder pedal system for a light aircraft as claimed in claim 6, wherein connection tubes having flanges are coupled to both ends of the skin of said transmission flexible cables, and cap nuts that hook said flanges and bolts screw-fastened by said cap nuts and through which said transmission axes and control screw rods are penetrated are provided so that said cap nuts are fastened by said bolts to thereby rotate the core wire of said transmission flexible cables while their skins are fixed.

* * * * *